Figure 3:
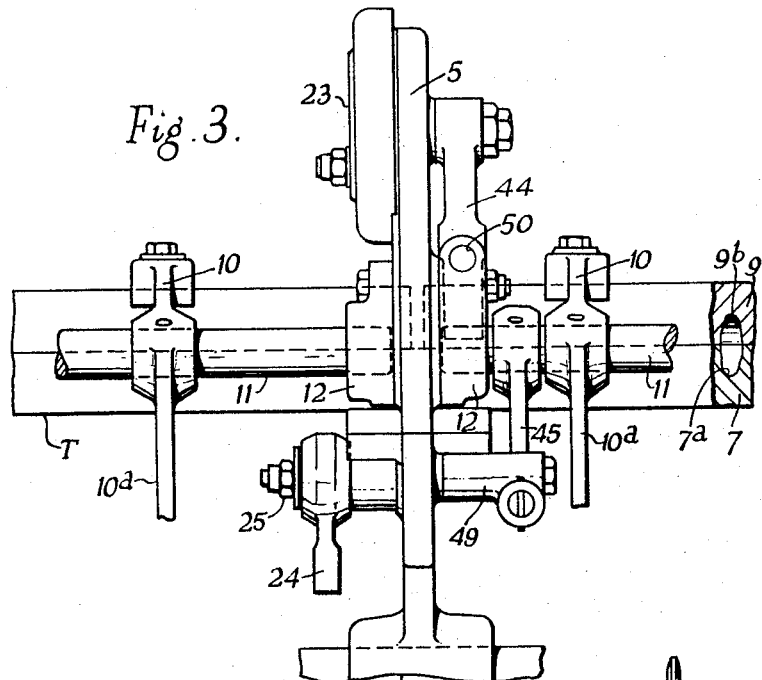

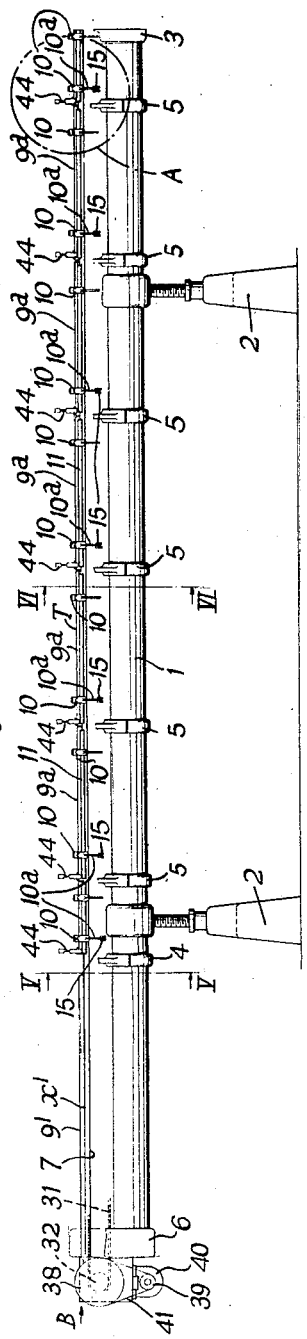
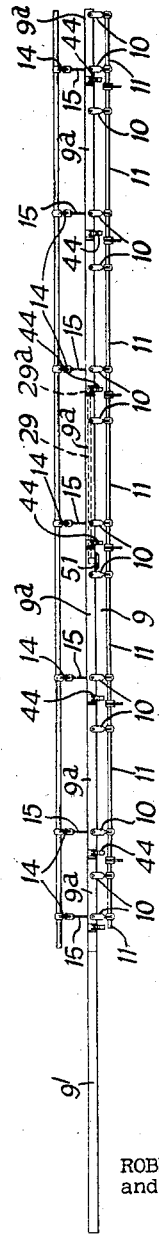
Fig. 1.
Fig. 2.
ROBERT CECIL TAYLOR
and RICHARD GRUNDY
INVENTORS
ATTORNEYS Dec. 8, 1959   R. C. TAYLOR ET AL   2,915,810
BAR FEEDS FOR AUTOMATIC LATHES AND OTHER MACHINE TOOLS
Filed Nov. 20, 1958   5 Sheets-Sheet 2

ROBERT CECIL TAYLOR
and RICHARD GRUNDY
INVENTORS

BY
ATTORNEYS

ROBERT CECIL
TAYLOR and RICHARD
GRUNDY
INVENTORS

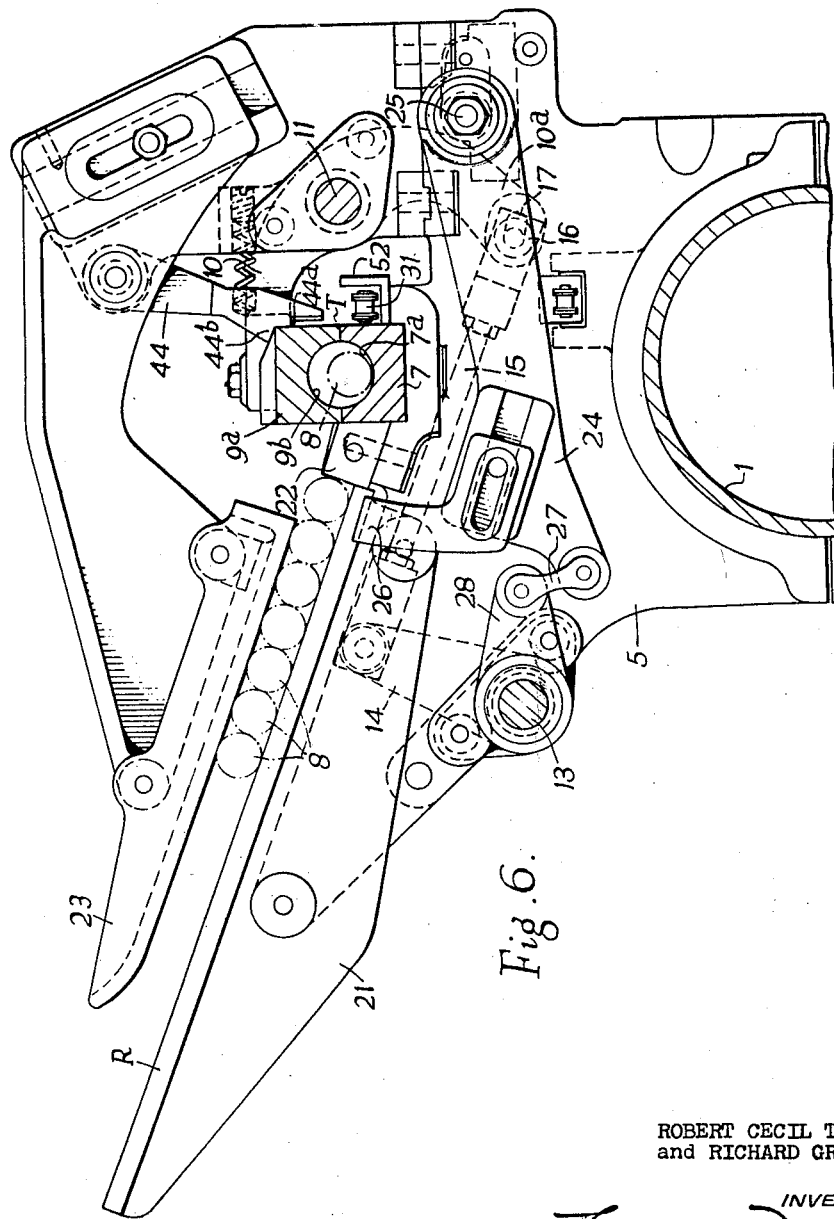

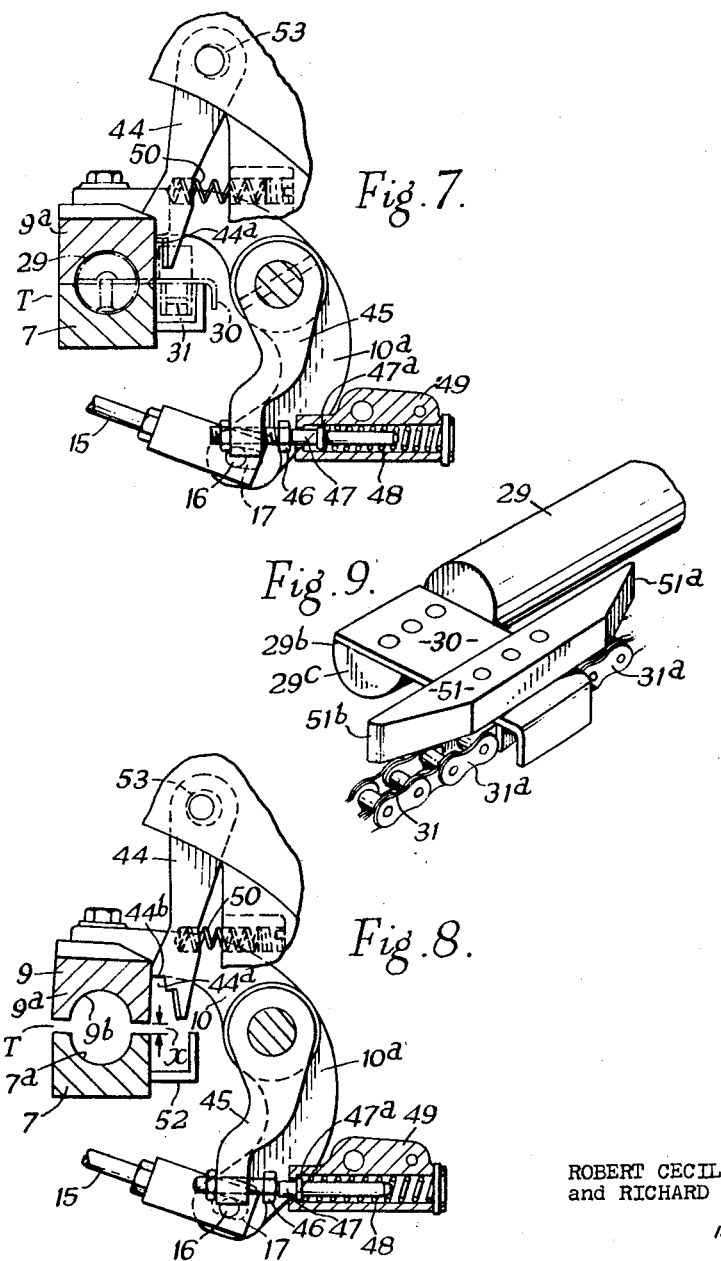

United States Patent Office 2,915,810
Patented Dec. 8, 1959

2,915,810

BAR FEEDS FOR AUTOMATIC LATHES AND OTHER MACHINE TOOLS

Robert C. Taylor, Braunstone, and Richard Grundy, Forest East, England, assignors to Ratby Engineering Company Limited, Earl Shilton, Leicestershire, England, a British company Application November 20, 1958, Serial No. 775,238

Claims priority, application Great Britain December 2, 1957

13 Claims. (Cl. 29—93)

This invention concerns bar feeds for machine tools such, for instance, as capstan lathes, automatic or semi-automatic lathes, centreless grinders, and so on.

By a "bar-feed" is meant, in this specification, an apparatus comprising, in combination, a stand upon which is mounted a long and horizontally disposed tube adapted to receive and support a bar or rod to be converted by a machine tool into successively produced machined work components, a pusher element which is slidable axially within the tube and is arranged to act upon the appropriate end of the supported bar or rod, and means for importing to the pusher element in the appropriate direction a driving force sufficient for pressing upon the said end of the bar or rod and pushing the latter forward for the purpose of feeding it into the machine tool as required.

The invention has for its object to provide improvements in a bar feed of the kind in which the tube is divided longitudinally into two halves which are separable suchwise as to open the tube at one side, and means are provided for effecting separation of the said tube halves and simultaneously acting upon a fresh bar or rod located on or in an adjoining support or magazine so that it is permitted to move into the tube through the lateral opening therein.

One example of a bar feed of the kind referred to is that forming the subject of our prior United States patent application Serial No. 540,700 (Patent No. 2,874,871 issued Feb. 24, 1959).

A particular aim of the present invention is to enable the two halves of the feed tube to be fully closed together without any gap between them suchwise as to provide a totally enclosed passage for a bar or rod being fed into the machine tool.

According to this invention one half (referred to as the "lid") of the feed tube is divided transversely at intervals into a plurality of alignable and adjoining independent sections which are all adapted to be locked by means of latches to the unitary complementary half of the tube after a fresh bar or rod has been permitted to move laterally thereinto, the said latches being so releasible during each advance of the pusher element to feed a bar or rod forwardly, that the lid sections are successively unlocked to permit of the free passage between the two halves of the tube of a carrier member by means of which the pusher element is attached to an endless driving member, e.g. chain employed to propel it back and forth.

As the lid sections are unlocked seriatim they may be conveniently permitted to open partially to an extent just sufficient to open up a gap or slot for the passage of the pusher element carrier member. Moreover, the bar or rod is prevented from opening the tube and being flung out of the latter under centrifugal action.

In accordance with an important feature of this invention, the tube lid sections may be permitted a limited degree of pivotal movement independently of one another, under spring control, the arrangement being such that the lid sections are normally held locked to the complementary half of the tube by the aforementioned latches, against the spring action, and the said sections are adapted to move towards an open status under the spring influence whenever they are unlocked by release of the latches.

Figure 4:
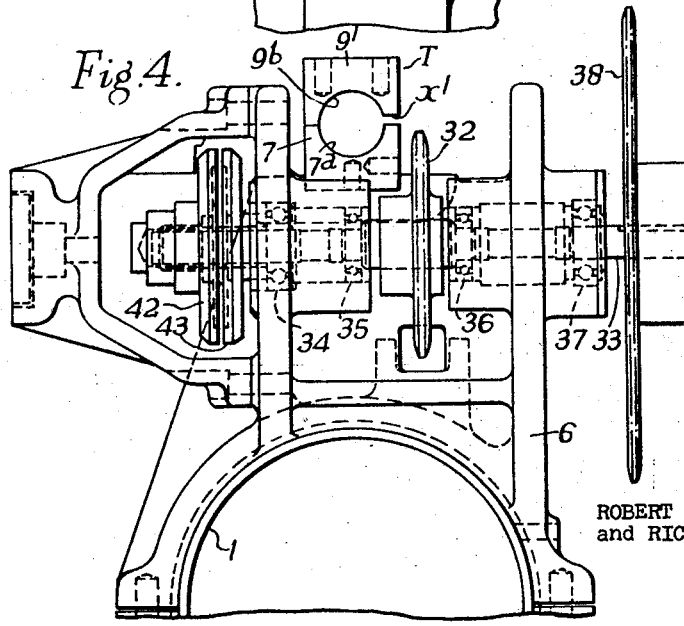
Figure 5:
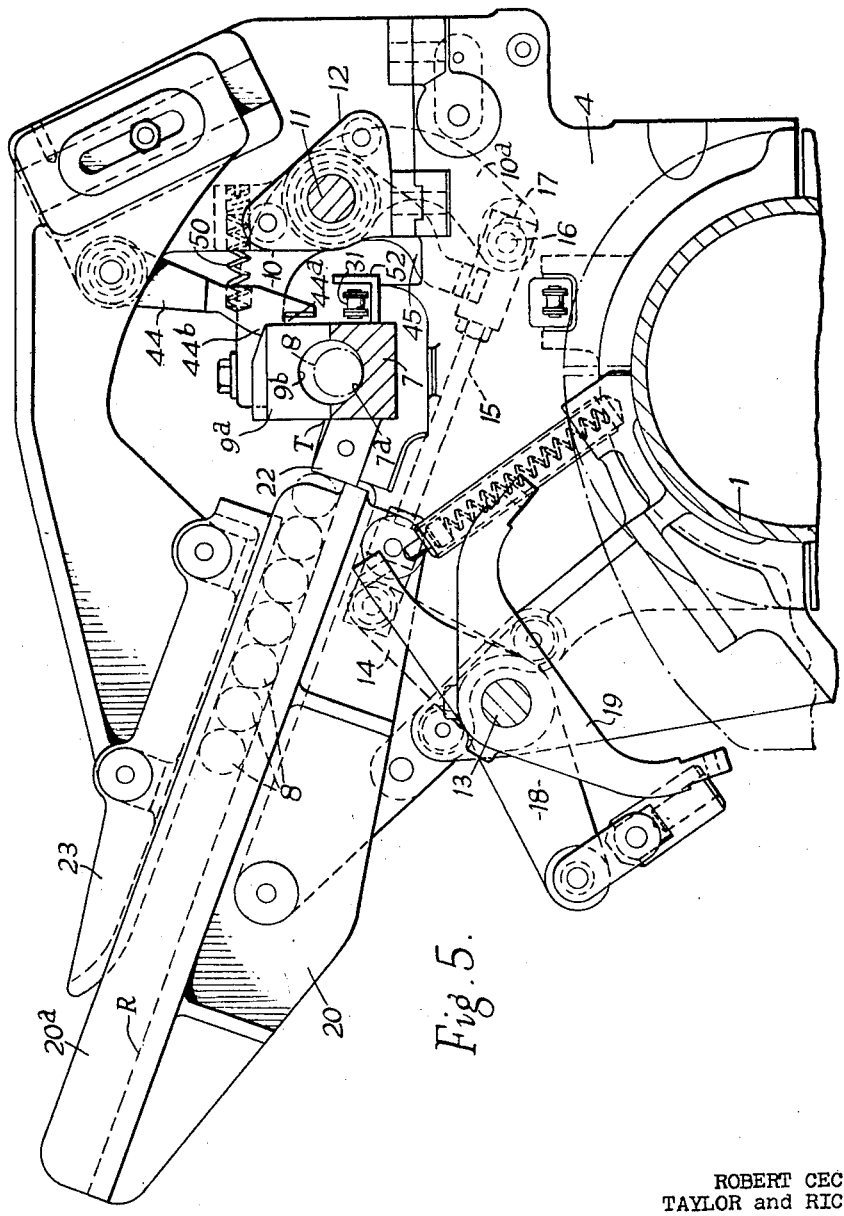

In order that the invention may be more clearly understood and readily carried into practical effect, a specific constructional example of a bar feed embodying the same will now be described with reference to the accompanying drawings, wherein, Figure 1 is a front elevation of the said bar feed with certain parts thereof removed for the sake of clarity, Figure 2 is a schematic plan view of the bar feed with the framework omitted—again for clarity, Figure 3 is a detail front elevation of the portion of the bar feed ringed round at A towards the right-hand end of Figure 1, Figure 4 illustrates a portion of the left-hand end of the bar feed as viewed in the direction of the arrow B in Figure 1, Figures 5 and 6 are cross-sectional views taken on the lines V—V and VI—VI of Figure 1 respectively, Figure 7 is a detail cross-sectional view showing a section of the lid of the tube locked upon the complementary bottom half of the latter by means of the corresponding latch, Figure 8 is a similar view to Figure 7 but showing the said latch released and the lid section held open by a spring to provide a gap for the passage of the pusher element carrier member, and Figure 9 is a detail perspective view illustrating the tail end of the pusher element, the carrier member therefor, a portion of the endless driving chain to which the said member is attached and the cam for releasing the latches during a forward traverse of the pusher element.

Like parts are designated by similar reference characters throughout the drawings.

Referring to Figure 1 it will be seen that the framework of the illustrated bar feed includes a horizontal tube 1 of comparatively large diameter which together with adjustable supports 2 carrying the same are arranged to bear upon the floor, constitutes a stand. Clamped upon the tube 1 are right and left-hand end frames 3 and 4 respectively and a plurality of suitably spaced intermediate frames 5. A side of the left-hand end frame 4 is clearly shown in Figure 5, whilst an intermediate frame is depicted from the front in Figure 5 and from the side in Figure 6.

Similarly clamped upon the extreme left-hand end of the tube 1 is a rigid support bracket 6 for a purpose presently to be described.

The frames 3, 4 and 5 and the support bracket 6 are all cast with channel form bearer recesses in which is seated and secured the bottom half 7 of a horizontally disposed feed tube T designed to receive and support a bar or rod 8 (Figures 5 and 6) to be fed into a machine tool. The said bottom half 7 of the tube T consists of a one-piece bar of rectangular cross-section the upper surface of which is longitudinally channelled as at 7a from end to end. The complementary upper half or lid 9 of the tube T, on the other hand, is, in accordance with the characteristic feature of the present invention, divided transversely at regular intervals into a plurality of adjoining independent sections 9a. As will be seen in Figures 1 and 2, the two endmost lid sections 9a of the series are shorter than the others. Each of these lid sections 9a consists of a length of bar of a similar cross-section to the bottom half 7 of the tube T and correspondingly channelled at 9b on its underside. Each such lid section, moreover, is carried by a pair of spaced two-armed levers 10 which are rigidly secured upon a comparatively short operating shaft 11 mounted to turn about its axis in bearings such as 12 combined with the frames 3, 4 and 5. Two of these bearings 12 mounted on an intermediate frame 5 are clearly shown in Figure 3.

Thus, by appropriately turning all of the lid operating shafts 11 simultaneously, the sectional lid or upper half 9 of the tube T is swung up to effect separation of the two halves 7 and 9 and thereby open the said tube to receive a fresh bar or rod 8. For so turning the individual shafts 11 there is provided at the rear of the bar feed, a horizontal rock shaft 13 which is mounted to turn in bearings in the frames 3, 4 and 5. Rigidly secured upon this shaft 13 are arms 14 which are connected, through the medium of links 15, with downwardly and rearwardly directed arms 10a of certain of the levers 10 (i.e. one per lid section). Thus, whenever the rock shaft 13 is turned anti-clockwise (viewing it in Figure 5 or 6), the relevant arms 10a will be pulled rearwardly to turn all of the levers 10, and hence also the lid-operating shafts 11, clockwise so as to swing up the lid sections 9a and open the tube T. Conversely, by turning the rock shaft 13 clockwise, the lid sections 9a will be swung down to close the said tube. Be it noted, however, that the forward ends of the links 15 have a pin-and-slot connection 16, 17 with the relevant arms 10a; this is to permit the individual shafts 11 to have a limited degree of turning movement independently of one another under spring control for a purpose hereinafter to be described. At its left hand end, the rock shaft 13, which extends continuously the full length of the lid 9, has rigidly secured thereon, a two-armed, spring-influenced actuating lever 18 (see Figure 5) adapted to be acted upon by a pneumatic cylinder and piston device (not shown) to open the sectional lid 9 at appropriate times. A lever 19, also mounted on the shaft 13, is associated with a reversing valve in the pneumatic system and actuation of which valve effects closure of the lid 9. Such system, however, forms no part of the present invention.

At the rear of the bar feed, and thus at one side of the longitudinally divided tube T, there is an inclined rack R constituted by upwardly inclined and rearwardly directed brackets 20 and 21 attached to the frames 3, 4 and 5 (see Figures 5 and 6). These brackets, elongated in form, have plane upper surfaces to support a plurality of bars or rods 8 arranged on the rack one behind the other. Secured to the frames 3, 4 and 5 at the lower ends of the brackets 20 and 21 are permanently fixed abutments 22 which prevent the bars or rods 8 rolling downwardly. Mounted above the brackets 20 and 21 are adjustable guards 23 designed to prevent bars or rods 8 placed on the rack R from becoming displaced and riding over one another out of control. In short, the brackets, together with the guards, form bar or rod-receiving channels or pockets. The rack bracket 20 attached to the left-hand end frame 4 has an upwardly extending flange 20a against which the bars or rods 8 can abut.

The bar feed includes means adapted, each time the feed tube T is opened, to kick up the lowermost bar or rod 8 from the rack R so that this bar or rod can roll over the upper surfaces of the abutments 22 into the open tube, from one side thereof, the remainder of the bars or rods thereupon rolling down the rack so as to fill the space vacated. Referring to Figure 6, it will be seen that the said means for kicking up the lowermost bar or rod include levers such as 24 which are fulcrummed at 25 upon the sides of the intermediate frames 5, near the fronts thereof, and are furnished at their rearwardly directed free ends with adjustable projectors 26 disposed immediately beneath the first, i.e. the lowermost, bar or rod 8 on the rack R. The extremities of these projector levers 24 are connected, by means of limbs 27, to further arms 28 rigidly secured upon the rock shaft 13. Consequently, as this shaft is turned anti-clockwise (Figure 6) to raise the lid 9 and open the feed tube T to receive a fresh bar or rod, the projectors 26 are automatically raised sharply to kick up the lowermost bar or rod 8 and enable it to roll over the abutments 22 into the tube T.

The bar feed also includes a rod-like pusher element 29 which is slidable axially within the tube T. The nose 29a (Figure 2) of the piston element acts upon the tail end of a bar or rod 8 supported in the feed tube T. The tail end of the pusher element 29 is attached to a carrier member 30 by means of which the said element is attached to an endless driving chain 31 employed to propel back and forth. As seen in Figure 9, the carrier member 30 consists of a flat section blade the inner end of which is secured to a flat surface 29b of a reduced portion 29c of the pusher element 29 at the tail end thereof, the blade extending laterally from the pusher element and being attached at its outer end portion to links 31a of the endless driving chain 31.

The driving chain 31 is passed around chain sprockets at opposite ends of the bar feed. Of these chain sprockets that at the left hand end of the apparatus is indicated at 32 in Figure 4. This chain sprocket is secured upon a shaft 33 mounted for rotation in suitable anti-friction bearings 34, 35, 36 and 37 in the support bracket 6 aforesaid. The shaft 33 is extended beyond the front of the bracket 6 and has secured thereon a chain wheel 38 around which and a driving sprocket 39 driven by an electric motor 40 is passed a drive-transmitting chain 41 (see Figure 1). The motor 40 is arranged to drive the chain, and hence also the pusher element 29, in both the forward and the reverse directions. Thus, if, as may be, a D.C. electric motor is employed, then a pair of associated and alternately electrically operated clutches 42, 43 mounted on the drive shaft 33 of the chain sprocket 32 may be provided to enable the chain 31 to be driven either forwardly or in reverse, as required.

A part travelling with the pusher element is adapted, as the said element completes an operative traverse, to act on and displace connections operable to actuate and close a limit switch for the purpose of initiating a reversal in the drive provided by the electric motor. For instance, where, as may be, a pair of magnetic clutches are associated with the chain drive shaft 33 driven by an A.C. motor, then closure of the switch may advantageously initiate ultimate closure of an electrical circuit whereby the forward feed clutch is de-energised and the reverse clutch is energised. But where a D.C. motor is employed, closure of the said electrical circuit may reverse the motor itself.

In either event closure of the said limit switch is maintained until a further switch controlled from the machine tool being fed by the bar feed, is also closed to initiate automatic stoppage of said machine tool. That is to say, practically simultaneously with automatic stoppage of the machine tool, each time a bar or rod has been used up, the chain drive is automatically reversed to return the pusher element to its original starting position.

Any other appropriate form of reversible prime mover or rotary means of conveying power may, however, be employed in lieu of an electric motor, although the driving arrangement forms no actual part of the invention.

In accordance with the present invention, each of the independent sections 9a of the lid 9 of the tube T is adapted to be locked by means of a latch 44. As previously mentioned, these latches are releasable during each advance of the pusher element 29 that the lid sections 9a are successively unlocked and permitted partially to open to an extent just sufficient to open up a gap x (see Figure 8), thereby permitting of the free passage between the two halves 7 and 8 of the tube of the pusher element carrier blade 30. Rigidly secured upon each of the individual rod-operating shafts 11 is a depending arm 45 in the free end of which is secured an adjustable abutment 46 arranged in contact with a plunger 47. As shown in Figures 7 and 8 each plunger 47 is mounted for movement axially against and under the action of a compression spring 48 located in a small relatively fixed housing 49 bolted to the relevant end or intermediate frame. Each such plunger, moreover, is flanged at 47a to provide a shoulder which, upon release of tthe corresponding latch 44 to unlock the relevant lid section 9a, is urged by its spring 48 to the end of the housing 49 which end constitutes a stop to limit the partial opening movement of the unlocked lid section. The abutments 46 are so axially adjusted with respect to the arms 45 as to maintain the lid sections 9a partially open, during a reverse traverse of the pusher element 29 to its original starting position after a bar or rod 8 has been used up, for the purpose of allowing unimpeded passage of the pusher element carrier blade 30. The lid sections 9a are forced into the closed position against the pressure of the springs 48 and are held closed by the latches 44 against the spring action.

Each of the latches 44, which is influenced by a compression spring 50 (Figures 7 and 8) urging it towards the feed tube T, consists of a depending rockable lever the operating, i.e. lower, extremity of which is so recessed at 44a as to provide a shoulder 44b adapted for engagement with the appropriate upper edge of a lid section 9a to lock the latter to the lower half 7 of the feed tube.

For releasing the latches 44 seriatim during a forward traverse of the pusher element 29, there is provided on the pusher element carrier blade 30 a cam 51 which is shown more clearly in Figure 9 and has a suitably bevelled leading end 51a which noses its way between the lid sections 9a and the recessed lower extremities of the latches 44 and, with a wedging action, pushes the latches away from the lid sections against the action of the biasing spring 50. The opposite end of the cam 51 may, as shown, be similarly bevelled at 51b to secure a free passage for the cam during each reverse traverse of the pusher element 29. It will be noted in Figure 2 that the nose 29a of the pusher element 29 enters the next locked lid section 9a before the previous section is unlocked. In Figure 2 the cam 51 is just about to be entered between a lid section and a latch to effect release of the latter.

As will be appreciated, the upper flat surface of the lower half 7 of the feed tube T constitutes a slideway for the pusher element carrier blade 30. Moreover, there is mounted adjacent to the front side of this lower half 7 an angle strip 52 arranged to support the upper run of the driving chain 31.

Referring to Figures 1 and 4, it will be seen that the lid 9 of the tube T extends from the right hand end of the bar feed only up to the left hand end frame 4. The remaining portion of the lower half 9 of the tube is complemented by a fixed upper half portion 9' between which and 7 there is a permanent gap x' to permit of the free passage of the carrier blade 30 whenever the pusher element is fully drawn back clear of the main lidded portion of the tube to enable a fresh bar or rod 8 to be received thereinto.

The latches 44 are adjustable by means of eccentrics 53 (see Figures 7 and 8).

We claim:

1. A bar feed for a machine tool comprising, in combination, a stand, a horizontally disposed feed tube mounted on the said stand for receiving and supporting a bar to be fed into the machine tool, the said tube being divided longitudinally into two halves which are separable to open the tube at one side, and one of such halves constituting a lid and being divided transversely at intervals into a plurality of adjoining independent lid sections, a support adjoining the feed tube for carrying a supply of bars, a pusher element which is slidable axially within the tube and arranged to act on the rear end of a bar supported in the latter, an endless driving member for propelling the said pusher element back and forth, a carrier member by means of which the pusher element is both carried and attached to said endless driving member, means for effecting separation of the tube halves by opening the lid as a whole, means for simultaneously acting upon a fresh bar on the aforesaid support so that it is permitted to move into the opened feed tube from one side thereof, a series of latches to lock the lid sections to the complementary half of the tube after a fresh bar has been permitted to move laterally into the latter, and means for releasing the latches seriatim during each advance of the pusher element to feed a bar into the machine tool so that the lid sections are successively unlocked to permit of the free passage of the pusher element carrier member between the two halves of the tube.

2. A bar feed according to claim 1, wherein the independent lid sections are subject to spring influence and, when unlocked seriatim, are permitted a limited degree of movement independently of one another each to open partially under the spring influence to an extent just sufficient to open up a gap between it and the complementary half of the feed tube for the free passage of the pusher element carrier member.

3. A bar feed according to claim 1, wherein the carrier member for the pusher element consists of a flat section blade the inner end of which is secured to the tail end of the pusher element, the said blade extending laterally from the pusher element and being attached at its outer end to the endless driving member.

4. A bar feed according to claim 1, wherein the half of the feed tube complementing the lid consists of a one-piece bar of rectangular cross-section the appropriate flat surface of which is longitudinally channelled from end to end, and each of the lid sections consists of a bar of a similar cross-section and correspondingly channelled longitudinally on its inner side.

5. A bad feed for a machine tool comprising, in combination, a stand, a horizontally disposed feed tube mounted on the said stand for receiving and supporting a bar to be fed into the machine tool, the said tube being divided longitudinally into two halves which are separable to open the tube at one side, and one of such halves constituting a lid and being divided transversely at intervals into a plurality of adjoining independent lid sections, spaced levers attached to and carrying the said lid sections, individual lid section operating shaft disposed in axial alignment and turnable independently of one another, the levers carrying each lid section being rigidly secured to and connected by the corresponding individual operating shaft, a support adjoining the feed tube for carrying a supply of bars, a pusher element which is slidable axially within the tube and arranged to act on the rear end of a bar supported in the latter, an endless driving member for propelling the said pusher element back and forth, a carrier member by means of which the pusher element is both carried and attached to said endless driving member, means operable to turn all of the said individual operating shafts simultaneously for effecting separation of the tube halves by opening the lid as a whole, means for simultaneously acting upon a fresh bar on the aforesaid support so that it is permitted to move into the opened feed tube from one side thereof, a series of latches to lock the lid sections to the complementary half of the tube after a fresh bar has been permitted to move laterally into the latter, and means for releasing the latches seriatim during each advance of the pusher element to feed a bar into the machine tool so that the lid sections are successively unlocked and permitted to open partially to an extent sufficient to open up a gap between each lid section and the complementary half of the tube for the free passage of the pusher element carrier member.

6. A bar feed according to claim 5, wherein there is rigidly secured upon each individual lid section operating shaft an arm which is subjected to the pressure of a spring tending to turn the said shaft in such a direction as to move the corresponding lid section towards an open status.

7. A bar feed for a machine tool comprising, in combination, a stand, a horizontally disposed feed tube mounted on the said stand for receiving and supporting a bar to be fed into the machine tool, the said tube being divided longitudinally into two halves which are separable to open the tube at one side, and one of such halves constituting a lid and being divided transversely at intervals into a plurality of adjoining independent lid sections, spaced levers attached to and carrying the said lid sections, individual lid section operating shafts disposed in axial alignment and turnable independently of one another, the levers carrying each lid section being rigidly secured to and connected by the corresponding individual operating shaft, arms rigidly secured to said individual operating shafts, there being one arm to each such shaft, abutments on said arms, plungers arranged in contact with said abutments, fixed housings accommodating the plungers, compression springs located in said housings and pressing on the plungers and hence on the arms and so tending to turn the operating shafts in such a direction as to move the lid sections towards an open status, a support adjoining the feed tube for carrying a supply of bars, a pusher element which is slidable axially within the tube and arranged to act on the rear end of a bar supported in the latter, an endless driving member for propelling the said pusher element back and forth, a carrier member by means of which the pusher element is both carried and attached to said endless driving member, means operable to turn all of the said individual operating shafts simultaneously for effecting separation of the tube halves by opening the lid as a whole, means for simultaneously acting upon a fresh bar on the aforesaid support so that it is permitted to move into the opened feed tube from one side thereof, a series of latches to lock the lid sections to the complementary half of the tube after a fresh bar has been permitted to move laterally into the latter, and means for releasing the latches seriatim during each advance of the pusher element to feed a bar into the machine tool so that the lid sections are successively unlocked and permitted to open partially under the influence of the spring-pressed plungers to an extent sufficient to open up a gap between each lid section and the complementary half of the tube for the free passage of the pusher element carrier member.

8. A bar feed according to claim 7, wherein the plungers are flanged to provide shoulders which, upon release of the latches to unlock the lid sections, are urged by the springs towards the ends of the fixed housings which limit the opening movements of the said lid sections.

9. A bar feed according to claim 7, wherein appropriate ones of the levers carrying the tube lid sections are linked by intermediate connections with a rock shaft which is common to all of the said sections and is turnable to effect movements of all of the latter in concert for fully opening and closing the lid as a whole at required times, means being provided to permit limited lost motion between the intermediate connections and the aforementioned levers to permit of independent partial opening movements of the lid sections when they are unlocked.

10. A bar feed according to claim 9, wherein the intermediate connections include links between the said levers and arms on the rock shaft, these links being connected to the said levers by pin-and-slot connections.

11. A bar feed for a machine tool comprising, in combination, a stand, a horizontally disposed feed tube mounted on the said stand for receiving and supporting a bar to be fed into the machine tool, the said tube being divided longitudinally into two halves which are separable to open the tube at one side, and one of such halves constituting a lid and being divided transversely at intervals into a plurality of adjoining independent lid sections, a support adjoining the feed tube for carrying a supply of bars, a pusher element which is slidable axially within the tube and arranged to act on the rear end of a bar supported in the latter, an endless driving member for propelling the said pusher element back and forth, a flat section blade by which the pusher element is both carried and attached to said endless driving member, means for effecting separation of the tube halves by opening the lid as a whole, means for simultaneously acting upon a fresh bar on the aforesaid support so that it is permitted to move into the opened feed tube from one side thereof, a series of latches to lock the lid sections to the complementary half of the tube after a fresh bar has been permitted to move laterally into the latter, and, on the pusher element carrier blade, a cam having a wedge-like bevelled end adapted, as the pusher element is propelled forwards, to nose its way between the lid sections and the operative extremities of the latches and to push the latter away from the lid sections so that these sections are unlocked successively to permit of the free passage of the pusher element carrier blade between the two halves of the tube.

12. A bar feed according to claim 11, wherein each of the latches is resiliently biased towards the feed tube and consists of a rockable lever the operative extremity of which is formed so as to provide a shoulder engageable with an edge of the lid section to lock the latter to the complementary half of the feed tube.

13. A bar feed according to claim 11, wherein the opposite end of the cam on the pusher element carrier blade is so formed as to secure a free passage for the cam during each reverse traverse of the pusher element.

References Cited in the file of this patent

UNITED STATES PATENTS

| | | |
|---|---|---|
| 2,108,274 | Tautz | Feb. 15, 1938 |
| 2,674,779 | Herzog | Apr. 13, 1954 |
| 2,848,786 | Kendall | Aug. 26, 1958 |